United States Patent
Yamanashi et al.

(10) Patent No.: US 6,220,018 B1
(45) Date of Patent: Apr. 24, 2001

(54) EXHAUST EMISSION CONTROL DEVICE

(75) Inventors: Fuminori Yamanashi, Tokyo; Kimiyoshi Nishizawa, Yokohama; Mikio Tsuzuki, Kawasaki; Ritsuo Sato, Yokohama, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/315,230

(22) Filed: May 20, 1999

(30) Foreign Application Priority Data

Jun. 1, 1998 (JP) .................................... 10-151409

(51) Int. Cl.$^7$ ....................................................... F01N 3/00
(52) U.S. Cl. ................... 60/285; 60/297; 60/301
(58) Field of Search .................................. 600/274, 284, 600/285, 297, 301

(56) References Cited

U.S. PATENT DOCUMENTS

| 5,315,824 | * | 5/1994 | Takeshima | 60/297 |
| 5,410,875 | * | 5/1995 | Tanaka et al. | 60/297 |
| 5,509,267 | * | 4/1996 | Theis | 60/285 |
| 5,589,143 | * | 12/1996 | Mori et al. | 60/297 |
| 5,634,331 | * | 6/1997 | Aoki et al. | 60/284 |
| 5,685,145 | * | 11/1997 | Sung et al. | 60/297 |
| 5,766,559 | * | 6/1998 | Blanchet et al. | 422/171 |
| 5,804,148 | * | 9/1998 | Kanesaka et al. | 422/174 |
| 5,914,090 | * | 6/1999 | Gottberg | 422/171 |
| 5,979,157 | * | 11/1999 | Kinugasa et al. | 60/274 |
| 5,989,507 | * | 11/1999 | Sung et al. | 423/213.5 |
| 6,044,644 | * | 4/2000 | Hu et al. | 60/302 |
| 6,089,014 | * | 7/2000 | Day et al. | 60/297 |
| 6,113,864 | * | 5/2000 | Kueper et al. | 422/180 |

FOREIGN PATENT DOCUMENTS

| 2-56247 | * | 2/1990 | (JP) . |
| 7-144119 | | 6/1995 | (JP) . |

* cited by examiner

Primary Examiner—Thomas Denion
Assistant Examiner—Diem Tran
(74) Attorney, Agent, or Firm—Foley & Lardner

(57) ABSTRACT

A three-way catalytic converter is provided in the exhaust passage of an engine. An HC trap type catalytic converter which acts as an HC trap and which has a greater oxygen storage capacity than the three-way catalytic converter is disposed downstream of the three-way catalytic converter. It is necessary to create a super-oxygenated atmosphere above an HC emission temperature in order to release HC which has been absorbed by the HC trap type catalytic converter. Since the oxygen storage capacity of the three-way catalytic converter is low, a super-oxygenated atmosphere is immediately created in the HC trap type catalytic converter by varying the air-fuel ratio to a lean air-fuel ratio.

8 Claims, 4 Drawing Sheets

EXHAUST EMISSION CONTROL DEVICE

FIELD OF THE INVENTION

The present invention relates to an exhaust emission control device for an engine.

BACKGROUND OF THE INVENTION

A technique is disclosed in Tokkai Hei 7-144119 published by the Japanese Patent Office in 1995 for the reduction of hydrocarbon (hereafter HC) emissions immediately after cold-starting an engine at which time a three-way catalyst disposed upstream has not reached an activation temperature. According to the technique, a composite catalyst, which is comprised of a three-way catalyst and an HC absorbent material and which allows for the absorption and release of HC depending on the temperature of the catalyst, is provided downstream of a three-way catalyst.

A composite catalyst enables the temporary absorption of HC exhausted immediately after cold-starting an engine. Thereafter when the upstream three-way catalyst reaches an activation temperature, the air-fuel ratio is varied to a lean air-fuel ratio resulting in a super-oxygenated air mixture which raises the catalyst temperature of the composite catalyst. As a result, absorbed HC is released and oxidized on the composite catalyst.

SUMMARY OF THE INVENTION

Metallic catalysts such as Pt, Ph, Pd and the like which are suitable for use in three-way catalysts have the function of binding oxygen. In particular, large amounts of oxygen can be bound in the catalyst by the use of an auxiliary catalyst with a large storage capacity such as cerium oxide in order to increase the oxygen binding capacity. The conversion efficiency of the catalyst can be increased by the operation of bound oxygen. The amount of bound oxygen is increased in the super-oxygenated atmosphere of a lean air-fuel ratio. Since oxygen is released from the catalyst in the oxygen-poor atmosphere of a rich air-fuel ratio, the amount of bound oxygen is reduced.

However, the composite catalyst discussed above may not function effectively as a result of the oxygen storage function of the three-way catalyst. This is a result of oxygen being released from the three-way upstream catalyst in an atmosphere of the rich air-fuel ratio immediately after cold-starting the engine. Therefore, oxygen is absorbed by the upstream catalyst even if the air-fuel ratio is subsequently switched to lean. So it is not possible to supply sufficient oxygen to the composite catalyst for a period of time. As a result, released HC released with rises in the catalyst temperature cannot be sufficiently oxidized and HC emissions rise.

It is therefore an object of this invention to improve the purification of HC immediately after cold-starting an engine by the provision of an exhaust emission control device provided with a catalyst which has an HC absorbing/releasing function and is placed downstream of a three-way catalyst.

In order to achieve the above object, this invention provides an exhaust emission control device for an engine provided with a fuel injection valve and an exhaust pipe. The exhaust emission control device comprises a three-way catalyst provided with a fixed oxygen storage capacity and which is disposed in the exhaust pipe, a composite catalyst which is disposed downstream of the three-way catalyst, which has a larger oxygen storage capacity than the three-way catalyst, which absorbs hydrocarbons (HC) below a fixed temperature and which releases the absorbed HC above the fixed temperature. A microcomputer is provided which is programmed to control the fuel injection valve so that an air-fuel ratio of the engine reaches a lean air-fuel ratio which is greater than a stoichiometric air-fuel ratio when HC absorbed by the composite catalyst is released and oxidized.

The details as well as other features and advantages of this invention are set forth in the remainder of the specification and are shown in the accompanying drawings.

DESCRIPTION OF THE PREFERRED EMBODIMENTS

Figure 1:
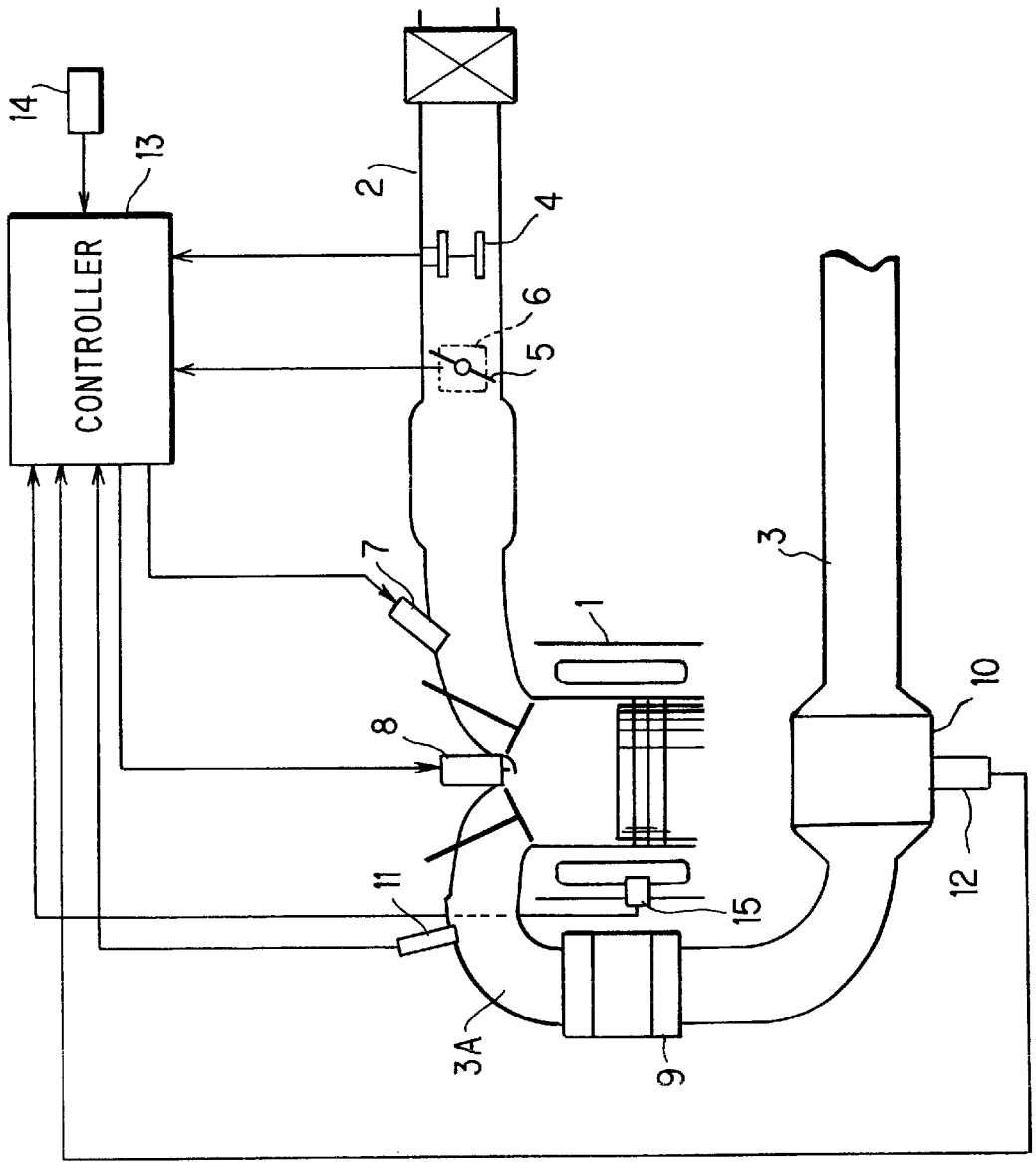
FIG. 1 is a schematic diagram of an engine provided with an exhaust emission control device according to this invention.

Referring to FIG. 1, an engine 1 is provided with an intake pipe 2 and an exhaust pipe 3. An air flow meter 4 and a throttle 5 are provided along the intake pipe 2. The opening of the throttle 5 is detected by a throttle opening sensor 6.

A three-way catalytic converter 9, and an HC trap type catalytic converter 10 acting as an HC trap is provided along the exhaust pipe 3. An air-fuel ratio is detected by a sensor 11 provided in proximity to the intake of the catalytic converter 9. The temperature of the HC trap type catalytic converter 10 is detected by a sensor 12.

In addition to the three-way catalyst, the catalytic converter 9 is provided with a nitrogen oxide (hereafter $NO_x$) absorbent material such as barium oxide which absorbs $NO_x$. The three-way catalytic converter 9 is provided in proximity to the outlet of the exhaust manifold 3A so that the temperature of the three-way catalyst quickly reaches an activation temperature after the engine 1 is activated.

The HC trap type catalytic converter 10 is provided with an oxidizing catalyst (composite catalyst) and a three-way catalyst on which a covering layer of HC absorbent material is formed on a catalytic carrier. The HC absorbent material absorbs HC when the catalyst temperature is low and releases HC when the catalyst temperature is high. The HC trap type catalytic converter 10 is provided downstream of the three-way catalytic converter 9.

The engine 1 is provided with an electromagnetic fuel injection valve 7 which injects fuel into an intake port and an ignition plug 8. A crank angle sensor 14 detects an engine rotation speed. A cooling water temperature sensor 15 detects the temperature of the cooling water of the engine 1.

A controller 13 which is formed from a microprocessor comprising a CPU, ROM, RAM and a I/O interface, controls the air-fuel ratio and ignition timing of the engine 1 based on an engine rotation speed detected by a crank angle sensor 14 and an intake air amount detected by the air flow meter 4.

The oxygen storage capacity of the HC trap type catalytic converter 10 is set higher than the oxygen storage capacity of the three-way catalytic converter 9. That is to say, the HC trap type catalytic converter 10 and the three-way catalytic converter 9 use an auxiliary catalyst such as ceria (cerium oxide) which has a high oxygen storage capacity in order to increase the oxygen storage function. A higher amount of auxiliary catalyst is used in the HC trap type catalytic converter 10 than in the three-way catalytic converter 9. Alternatively the sum of the oxygen storage capacity of the auxiliary catalyst and the oxygen storage capacity of the metal catalyst may be set so that the HC trap type catalytic converter 10 is greater than the three-way catalytic converter 9.

Figure 2:
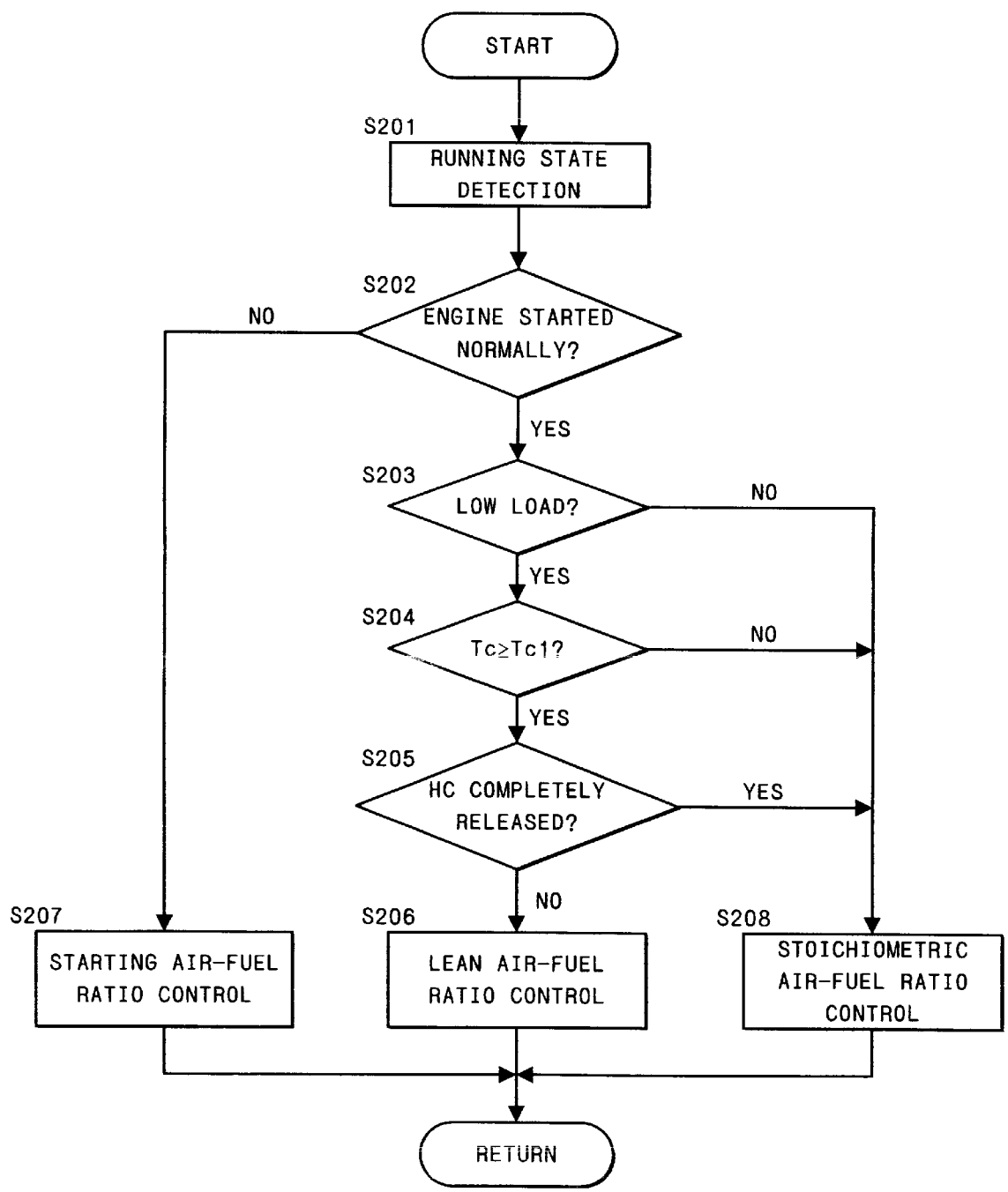
FIG. 2 is a flowchart showing an air-fuel ratio control process performed by a controller of the engine.

FIG. 2 is a flowchart showing the air-fuel ratio control process during engine warming up. The process is repeated at fixed time intervals by the controller 13.

Firstly in a step S201, the engine rotation speed, the air intake amount, cooling water temperature and temperature of the HC trap type catalytic converter 10 are detected.

Then in a step S202, it is determined whether or not the engine 1 has been started normally based on the engine rotation speed. When it is determined that the engine 1 has been started normally, the routine progresses to a step S203. When the engine 1 has not been started normally, the routine progresses to a step S207.

In the step S207, the air-fuel ratio is varied to a starting air-fuel ratio which is slightly richer than a stoichiometric air-fuel ratio in order to enhance the ignitionability and startability of the engine 1. The starting air-fuel ratio is set lower proportional to the temperature of the cooling water, that is to say, so that the air mixture is richer. As a result, the colder the engine is, the more easily HC is exhausted. In particular, when the three-way catalyst of the three-way catalytic converter 9 has not reached an activation temperature, the amount of exhausted HC increases. However, HC emitted from the engine 1 is momentarily absorbed by the HC absorbent material of the HC trap type catalytic converter 10 and is prevented from escaping into the atmosphere.

In the step S203, it is determined whether the engine 1 is in a fixed low load running state, which includes idling, based on the throttle opening and the intake air amount. When the engine 1 is determined to be in a low load condition, the routine progresses to a step S204, and when the engine is in a high load condition the routine progresses to a step S208.

In the step S208, fuel injection amount is feedback controlled based on engine rotation speed and intake air amount so that the air-fuel ratio equals a target air-fuel ratio based on an air-fuel ratio detected by the air-fuel ratio sensor 11. More precisely, the target air-fuel ratio is set to stoichiometric air-fuel ratio during normal running in order to enhance the conversion efficiency of the three-way catalyst. When the required load is high, for example when the vehicle is accelerating, the target air-fuel ratio is set to a ratio which is richer than the stoichiometric air-fuel ratio and the output of the engine is increased. Furthermore, fuel injection is terminated when the vehicle is decelerating and engine output is unnecessary.

In the step S204, it is determined whether or not the catalyst temperature Tc of the HC trap type catalytic converter 10 has reached an HC releasing temperature Tc1. In a step S205, it is determined whether or not the release of absorbed HC has been completed.

The amount of absorbed HC in the HC trap type catalytic converter 10 is estimated based on absorption efficiency, fuel injection amount and intake air amount In the same way, the amount of released HC is estimated on the basis of intake air amount and catalyst temperature. Thus, it is possible to determine whether or not HC release has been completed by a comparison of the estimated absorbed and released amounts.

When the catalyst temperature Tc is greater than the HC releasing temperature Tc1 (Tc$\geq$Tc1) and HC release has not been completed, the routine progresses to a step S206 wherein a target air-fuel ratio is set to a lean air-fuel ratio which is greater than a stoichiometric air-fuel ratio. Thereafter the engine is operated on the lean air-fuel ratio. In this way, it is possible to oxidize HC released from the HC absorbent material since super-oxygenated exhaust gases are supplied to the HC trap type catalytic converter 10. $NO_X$ generated during lean air-fuel ratio running is temporarily absorbed by the $NO_X$ absorbent material of the three-way catalytic converter 9. When the three-way catalyst reaches an activation temperature, the absorbed $NO_X$ is released and oxidized.

In contrast, when the catalyst temperature Tc is lower than the HC releasing temperature Tc1 and HC release is not complete, it is not necessary to vary the air-fuel ratio to a lean air-fuel ratio and the routine progresses to a step S208.

When the catalyst temperature has reached an HC releasing temperature, in order to totally oxidize HC released from the HC absorbent material, it is necessary for the atmosphere of the catalyst to be super-oxygenated to a degree. Therefore, as above, the air-fuel ratio is varied to a lean air-fuel ratio. In the present invention, since the oxygen storage capacity of the upstream three-way catalytic converter 9 is low in comparison with the HC trap type catalytic converter 10 which has an HC absorption material, almost no oxygen is stored in the upstream three-way catalytic converter 9 when lean air-fuel ratio running is commenced. Therefore, there is no lack of oxygen supplied to the downstream HC trap type catalytic converter.

Therefore, it is possible to create a suitable super-oxygenated atmosphere in the HC trap type catalytic converter 10 when lean air-fuel ratio running is commenced. As a result, it is possible to perform the releasing and oxygenation of HC effectively.

The number and orientation of the three-way catalytic converter 9 and the HC trap type catalytic converter 10 is not limited to the above embodiment and may be formed in the various arrangements shown in FIGS. 3a–3g.

In the figures, X represents a three-way catalyst provided immediately after the exhaust manifold 3A, Z is a second three-way catalyst provided downstream of the three-way catalyst X, Y is an HC absorbent material or a composite catalyst provided with an HC absorbent material, Y' is a composite catalyst provided with an HC absorbent material. In the figures, the arrangement of X with Y or Y', or Y with Z together represents the disposition of the components so represented in the same catalyst container.

Figure 3A:
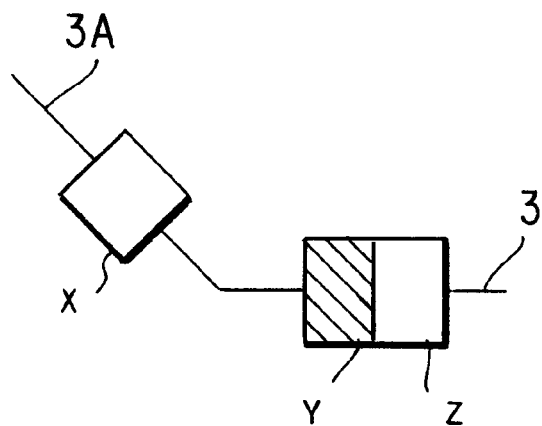
FIG. 3a–FIG. 3g is a schematic diagram showing another embodiment of the present invention.
Figure 3B:
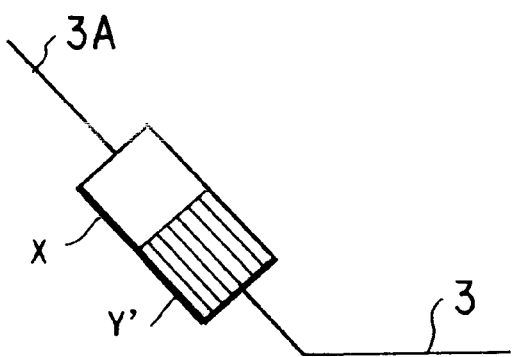
Figure 3C:
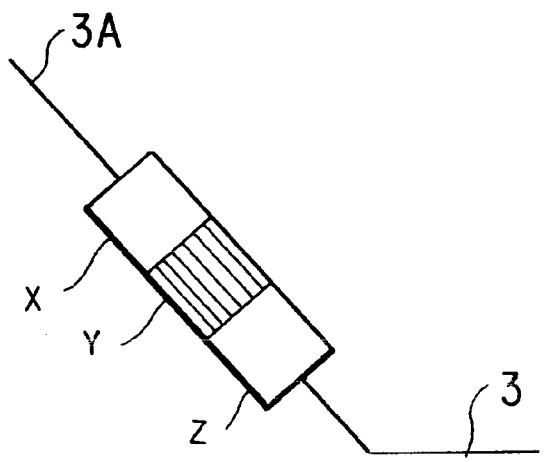
Figure 3D:
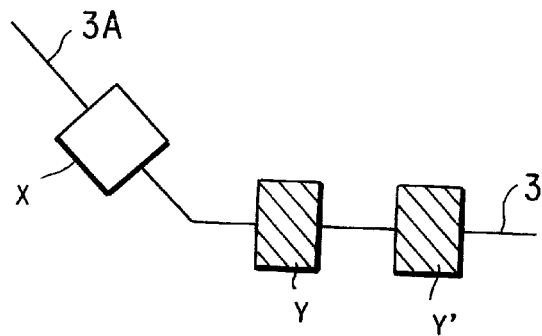
Figure 3E:
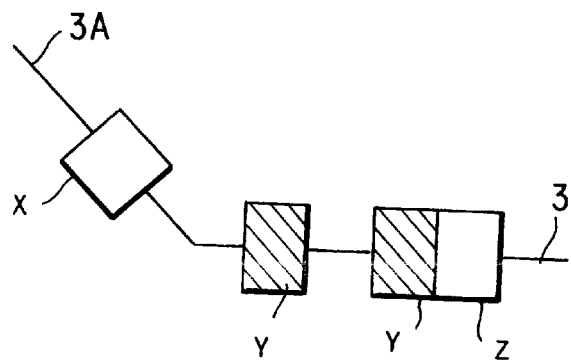
Figure 3F:
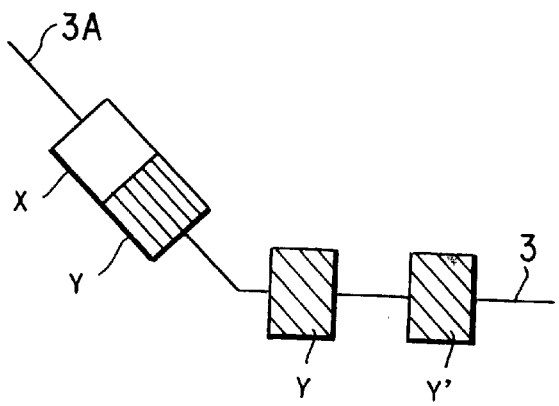
Figure 3G:
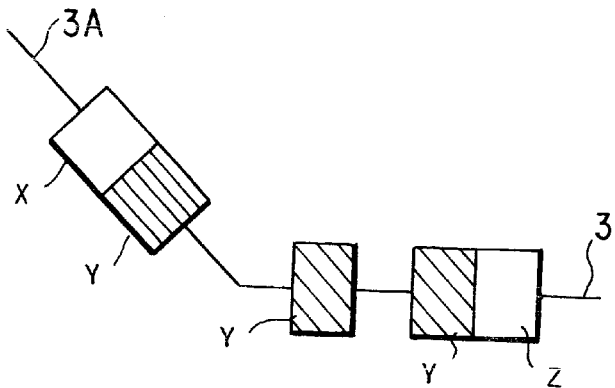

For example, in FIG. 3a, a catalytic converter provided with a three-way catalyst X is disposed immediately after an exhaust manifold 3A and a catalytic converter provided with an HC absorbent material Y and a second three-way catalyst Z is disposed downstream.

The entire contents of Japanese Patent Applications P10-151409 (filed Jun. 1, 1998) are incorporated herein by reference.

Although the invention has been described above by reference to certain embodiments of the invention, the invention is not limited to the embodiments described above. Modifications and variations of the embodiments described above will occur to those skilled in the art, in light of the above teachings.

The scope of the invention is defined with reference to the following claims.

What is claimed:

1. An exhaust emission control device for an engine comprising:
   a three-way catalyst disposed in an exhaust pipe of the engine, the three-way catalyst having an oxygen storage capacity;
   a composite catalyst disposed in the exhaust pipe downstream of the three-way catalyst, the composite catalyst absorbing hydrocarbons at lower temperature and releasing hydrocarbons at higher temperature, and the composite catalyst having a larger oxygen storage capacity than the three-way catalyst; and
   a microcomputer that is programmed to control an air-fuel ratio of the engine so as to provide a lean air-fuel ratio that is leaner than a stoichiometric air-fuel ratio when hydrocarbons absorbed in the composite catalyst are released and oxidized.

2. An exhaust emission control device according to claim 1 wherein
   said three-way catalyst is provided with a metallic and an auxiliary catalyst, said composite catalyst is provided with a metallic catalyst and an auxiliary catalyst, and the sum of the oxygen storage capacity of the metallic catalyst and the storage capacity of said auxiliary catalyst of said composite catalyst is greater than the sum of the oxygen storage capacity of the metallic catalyst and the storage capacity of said auxiliary catalyst of said three-way catalyst.

3. An exhaust emission control device according to claim 1 wherein
   said three-way catalyst is provided with a metallic catalyst and an auxiliary catalyst,
   said composite catalyst is provided with a metallic catalyst and an auxiliary catalyst, and
   the storage capacity of the auxiliary catalyst of said composite catalyst is greater than the storage capacity of the auxiliary catalyst of said three-way catalyst.

4. An exhaust emission control device according to claim 1 wherein said composite catalyst comprises:
   a three-way catalyst or an oxidation catalyst which has a covering layer of hydrocarbon absorbent material.

5. An exhaust emission control device according to claim 1 wherein said composite catalyst comprises:
   a hydrocarbon absorbent material; and
   a three-way catalyst or an oxidation catalyst which is disposed downstream of the hydrocarbon absorbent material.

6. An exhaust emission control device according to claim 1 wherein
   said engine is provided with an exhaust manifold, and
   said three-way catalyst is provided in proximity to said exhaust manifold.

7. An exhaust emission control device according to claim 1 wherein
   said three-way catalyst is provided with an $NO_x$ absorbent material which absorbs nitrogen oxides.

8. An exhaust emission control device for an engine comprising:
   a three-way catalyst disposed in an exhaust pipe of the engine, the three-way catalyst having an oxygen storage capacity;
   a composite catalyst disposed in the exhaust pipe downstream of the three-way catalyst, the composite catalyst absorbing hydrocarbons at lower temperature and releasing hydrocarbons at higher temperature, and the composite catalyst having a larger oxygen storage capacity than the three-way catalyst; and
   means for controlling an air-fuel ratio of the engine so as to provide a lean air-fuel ratio that is leaner than a stoichiometric air-fuel ratio when hydrocarbons absorbed in the composite catalyst are released and oxidized.

\* \* \* \* \*